(12) United States Patent
Hahn

(10) Patent No.: US 10,757,931 B1
(45) Date of Patent: Sep. 1, 2020

(54) PEST CONTROL APPARATUS TO IMPROVE HEALTH AND SAFETY OF USERS

(71) Applicant: Damon Hahn, Santa Fe, TX (US)

(72) Inventor: Damon Hahn, Sante Fe, TX (US)

(73) Assignee: Damon Hahn, Santa Fe, TX (US)

( * ) Notice: Subject to any disclaimer, the term of this patent is extended or adjusted under 35 U.S.C. 154(b) by 203 days.

(21) Appl. No.: 15/714,650

(22) Filed: Sep. 25, 2017

(51) Int. Cl.
*A01M 23/00* (2006.01)
*A01M 99/00* (2006.01)
*B25B 9/02* (2006.01)

(52) U.S. Cl.
CPC ............... *A01M 99/00* (2013.01); *B25B 9/02* (2013.01); *A01M 23/00* (2013.01)

(58) Field of Classification Search
CPC .... A01M 23/00; A01M 23/005; A01M 23/24; A01M 23/245; A01M 23/26; A01M 23/265; A01M 23/28; A01M 23/30; A01M 1/14; A01M 99/00; B25B 9/00; B25B 9/02
See application file for complete search history.

(56) References Cited

U.S. PATENT DOCUMENTS

| | | | | |
|---|---|---|---|---|
| 1,888,563 | A * | 11/1932 | Nixon | A01M 3/02 43/136 |
| 5,630,290 | A * | 5/1997 | Wade | A01M 3/022 43/136 |
| 6,185,862 | B1 * | 2/2001 | Nelson | A01M 1/14 43/136 |
| 8,438,686 | B2 * | 5/2013 | Morano | A47L 13/00 15/104.002 |
| 9,854,794 | B1 * | 1/2018 | Hand | A01M 3/022 |
| 2018/0368384 | A1 * | 12/2018 | Kim | A01M 3/04 |

* cited by examiner

*Primary Examiner* — Richard G Davis
(74) *Attorney, Agent, or Firm* — Rao DeBoer Osterrieder, PLLC; Dileep Rao

(57) ABSTRACT

A pest control apparatus to aid in placement of pest control devices in hard to reach areas and improve health and safety of users. The device can have a handle, an adhesive applied to a receiving pad, and a removable protective cover in contact with the adhesive. When utilized, the pest control apparatus can minimize contact with pests and/or rodents to prevent transmittal of disease.

10 Claims, 1 Drawing Sheet

PEST CONTROL APPARATUS TO IMPROVE HEALTH AND SAFETY OF USERS

FIELD

The present disclosure generally relates to a pest control apparatus to aid in placement of pest control devices in hard to reach areas and improve health and safety of users.

BACKGROUND

Throughout history, there has been a need to keep pests, such as insects and rodents away from crops and humans.

Various pest control methods are utilized in commercial and residential structures.

Methods of killing and trapping pests range widely. Contact with pests result in a host of health dangers to humans, including exposure to allergens and diseases transmitted by the pests.

A wide variety of diseases (often referred to as vector borne diseases) are spread by insects such as mosquitoes, sandflies, ticks, fleas, flies, and the like. Further dangers such as tularemia, leptospirosis, plague, hantavirus, and the like, exist from contact with rodents.

Often pest control methods require humans to come into close proximity, or even contact with such pests for either trapping or disposal of pests. Such contact is undesirable for health reasons.

Further, pest traps often need to be placed in hard to reach areas for maximum effectiveness. It is often necessary to place traps under structures, equipment, or appliances.

A need exists for a device to aid in placement of pest traps or pest control devices in hard to reach areas. A further need exists for a device to minimize contact with pests or pest contaminated pest control devices by humans.

The present disclosure addresses these needs.

BRIEF DESCRIPTION OF THE DRAWINGS

The detailed description will be better understood in conjunction with the accompanying drawings as follows.

Figure 1:
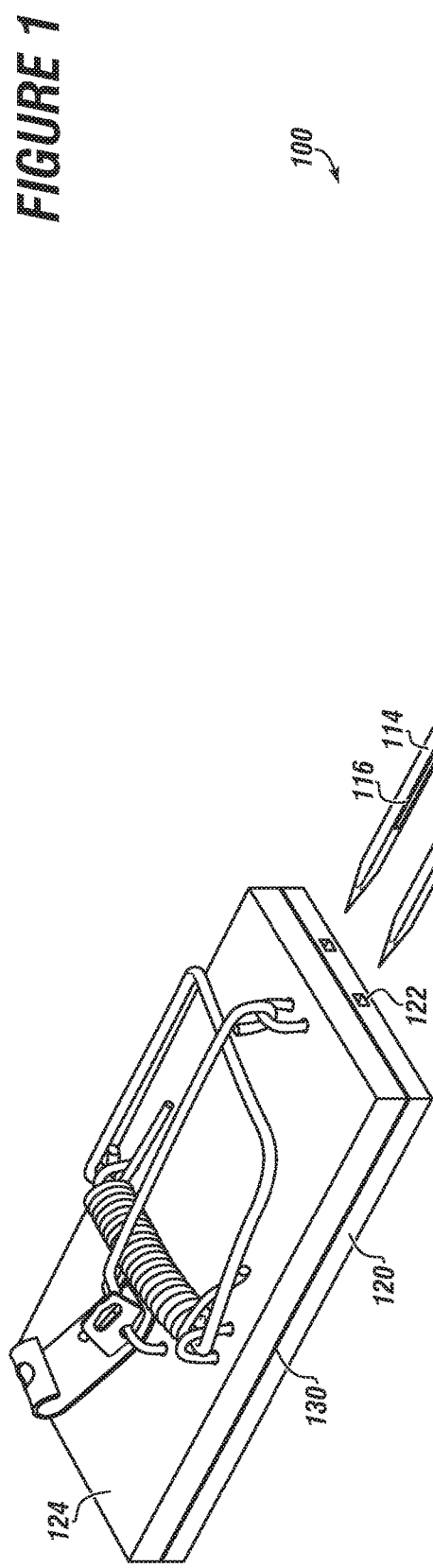
FIG. 1 depicts the pest control apparatus according to one or more embodiments.

The embodiments of the present disclosure are detailed below with reference to the listed Figures.

DETAILED DESCRIPTION OF THE EMBODIMENTS

Before explaining the present invention in detail, it is to be understood that the invention is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present invention. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to a pest control apparatus to aid in placement of pest control devices in hard to reach areas and improve health and safety of users.

The pest control apparatus can have a handle, a receiving pad in mechanical communication with the handle, an adhesive applied to the receiving pad, and a removable protective cover in contact with the adhesive.

The handle can be made of any suitable material as known to persons having ordinary skill in the art. The purpose of the handle is to allow easy placement of pest control traps and devices in hard to reach areas, such as behind appliances or in locations with limited space. The handle further serves to minimize contact with pests once traps have been triggered, activated, or otherwise contain pests.

In embodiments, the handle can have a plurality of telescoping components configured to adjust a length of the handle. Such telescoping components can be frictionally secured to each other to prevent undesired movement. In other embodiments, telescoping components can be mechanically secured using a tab and a notch, a spring-loaded mechanism, or any other means as known to persons having ordinary skill in the art.

In embodiments, the handle can be perforated in one or more places to allow a user to break and shorten the handle. This would allow for placement of the pest control apparatus in an unobtrusive manner without presenting a tripping hazard.

In embodiments, the handle can have a left rail and a right rail with at least one cross member connecting the left rail and the right rail. This allows for a wider and easier to grip handle, while keeping the weight of the apparatus to a minimum.

The handle can comprise a push tab, or other similar mechanism to release the receiving pad. The push tab can be in mechanical communication with the receiving pad, and displacing the push tab can release the receiving pad from the handle. This allows a user to avoid coming into contact with pests when emptying or disposing of a trap. Appropriate and equivalent release mechanisms can be selected by persons having ordinary skill in the art based upon the means of attachment of the receiving pad to the handle.

In embodiments, the pest control apparatus can have a sanitizing or disinfecting agent added to the handle or the receiving pad. Such an agent can be in the form of a gel or a coating. In other embodiments, the material of the handle can be resistant to microbes or other health hazards.

In embodiments, a left rail slot and a right rail slot can be oriented facing one another and at least a portion of the push tab can be configured to be housed within the left rail slot and the right rail slot.

A receiving pad can be attached to the handle. Any known means of attachment can be utilized, but it is desirable to allow for the easy detachment of the receiving pad. The receiving pad can be of any suitable material as known to persons having ordinary skill in the art.

In embodiments, the receiving pad can comprise an indentation, a notch, or a hollow to receive the handle. The receiving pad can be sized to accommodate a desired pest control device or mechanism, such as a mouse trap or a rat trap. In embodiments, the receiving pad can be trimmed or cut to a desired size and/or shape.

An adhesive can be applied to the receiving pad. A rodent trap can be secured to the receiving pad by the adhesive. In embodiments, the adhesive layer can act as a pest control device for insects or other pests.

The receiving pad can have an indentation, a notch, or a hollow to receive the handle. In embodiments, the handle is frictionally secured to the receiving pad. In other embodiments, the handle can be adhered to the receiving pad, or formed as a single piece.

Turning now to the Figures, FIG. 1 depicts the pest control apparatus according to one or more embodiments.

The pest control apparatus 100 can have a handle 110, a receiving pad 120, and an adhesive layer 130. Upon removal of a protective cover (not shown), a pest control device 124, such as a mouse trap, can be attached to the receiving pad with the adhesive. In other embodiments, the adhesive layer 130 itself can serve as the pest control device.

In the embodiment shown, the handle 110 comprises a left rail 112 and a right rail 114. The right rail 114 comprises a slot 116. The left rail 112 can have a similar slot (not shown) oriented to face slot 116. A push tab 118 can be at least partially housed within the slots.

The receiving pad can have a slot 122 to receive the handle 110. The handle 110 is frictionally secured to the receiving pad 120 in the embodiment shown. When the handle 110 is inserted into slot 122, the push tab 118 can rest against the receiving pad 120. Displacing the push tab 118 along the axis of the rails 112 and 114 can detach the receiving pad 120 from the handle 110, allowing for easy disposal.

Figure 2:
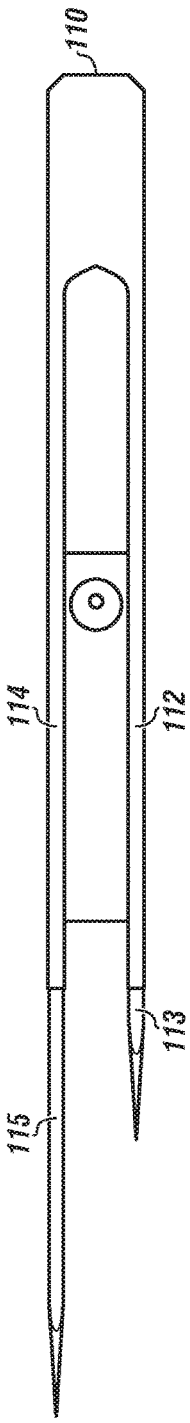
FIG. 2 depicts the handle of the pest control apparatus according to one or more embodiments.

FIG. 2 depicts the handle of the pest control apparatus according to one or more embodiments.

In this embodiment, the handle comprises a plurality of telescoping components 112, 113, 114, 115 allowing for the adjustment of the length of the handle 110. The components can be frictionally secured to each other, or by any means known to persons having ordinary skill in the art.

While the present disclosure emphasizes the embodiments, it should be understood that within the scope of the appended claims, the disclosure might be embodied other than as specifically described herein.

What is claimed is:

1. A pest control apparatus comprising:
 a a handle;
 b a disposable receiving pad in mechanical communication with the handle for receiving a pest control device;
 c an adhesive applied to the receiving pad adapted to securing the pest control device;
 d a removable protective cover in contact with the adhesive; and
 f the pest control device.

2. The apparatus of claim 1, wherein the handle comprises a plurality of telescoping components configured to adjust a length of the handle.

3. The apparatus of claim 1, wherein the receiving pad comprises an indentation, a notch, or a hollow to receive the handle.

4. The apparatus of claim 1, wherein the handle comprises a left rail and a right rail with at least one cross member connecting the left rail and the right rail.

5. The apparatus of claim 4, further comprising a push tab in mechanical communication with the receiving pad, a left rail slot on the left rail, and a right rail slot on the right rail, wherein the left rail slot and the right rail slot are oriented facing one another and at least a portion of the push tab is configured to be housed within the left rail slot and the right rail slot.

6. The apparatus of claim 5, wherein the push tab is in mechanical communication with the receiving pad, and further wherein displacing the push tab disengages the receiving pad from the handle.

7. The apparatus of claim 4, wherein the receiving pad comprises an indentation, a notch, or a hollow to receive at least a portion the left rail and the right rail.

8. The apparatus of claim 4, wherein the left rail and the right rail each comprise a plurality of telescoping components configured to adjust the length of the handle.

9. The apparatus of claim 1, further comprising a push tab, wherein the push tab is in mechanical communication with the receiving pad, and further wherein displacing the push tab disengages the receiving pad from the handle.

10. The apparatus of claim 1, wherein the pest control device is a pest trap or a rodent trap.

\* \* \* \* \*